United States Patent [19]

Hardigg

[11] 3,993,507

[45] Nov. 23, 1976

[54] BATTERY JAR

[76] Inventor: James S. Hardigg, Baptist Hill, Conway, Mass. 01341

[22] Filed: May 13, 1974

[21] Appl. No.: 469,498

[52] U.S. Cl. .............................................. 426/176
[51] Int. Cl.² ...................... H01M 2/02; B65D 5/40
[58] Field of Search ................ 136/166, 79, 80, 81; 206/2

[56] References Cited
UNITED STATES PATENTS

| | | | |
|---|---|---|---|
| 1,249,268 | 12/1917 | Willard | 136/166 |
| 1,306,001 | 6/1919 | Gammeter | 136/166 |
| 2,638,490 | 5/1953 | Snyder | 136/166 |
| 3,388,007 | 6/1968 | Fiandt | 136/166 |
| 3,424,623 | 1/1969 | Oakley et al. | 136/176 |

Primary Examiner—Donald L. Walton
Attorney, Agent, or Firm—Cushman, Darby & Cushman

[57] ABSTRACT

A battery jar is disclosed for supporting a plurality of elongated battery plates together with an electrolyte therein. The battery jar comprises an elongated casing formed of a plastic material such as polycarbonate plastic or ABS plastic wherein the plastic material provides both an acid barrier and a means for supporting the weight of the electrolyte and the battery plates. The casing includes a plurality of transversely disposed pressure-supporting ribs or hoops which are positioned about the periphery of the casing for providing support against the radial pressure exerted against the casing. In one example the transverse ribs are formed integral with the casing and permit longitudinal expansion of the casing when the casing is lifted.

2 Claims, 9 Drawing Figures

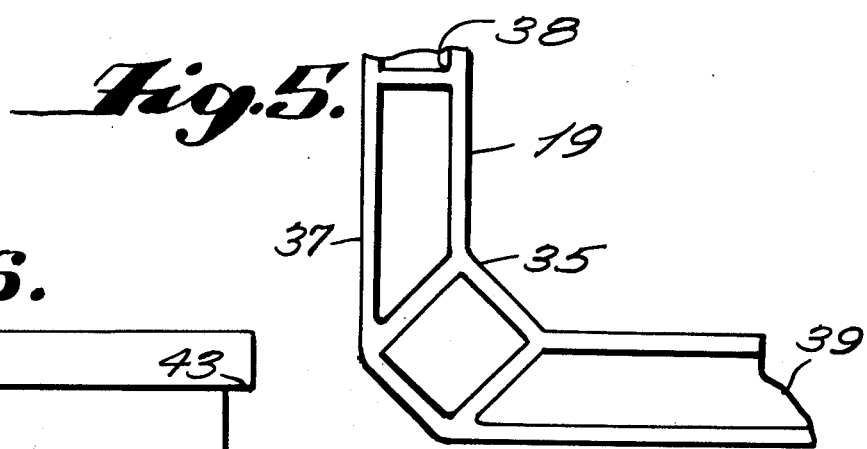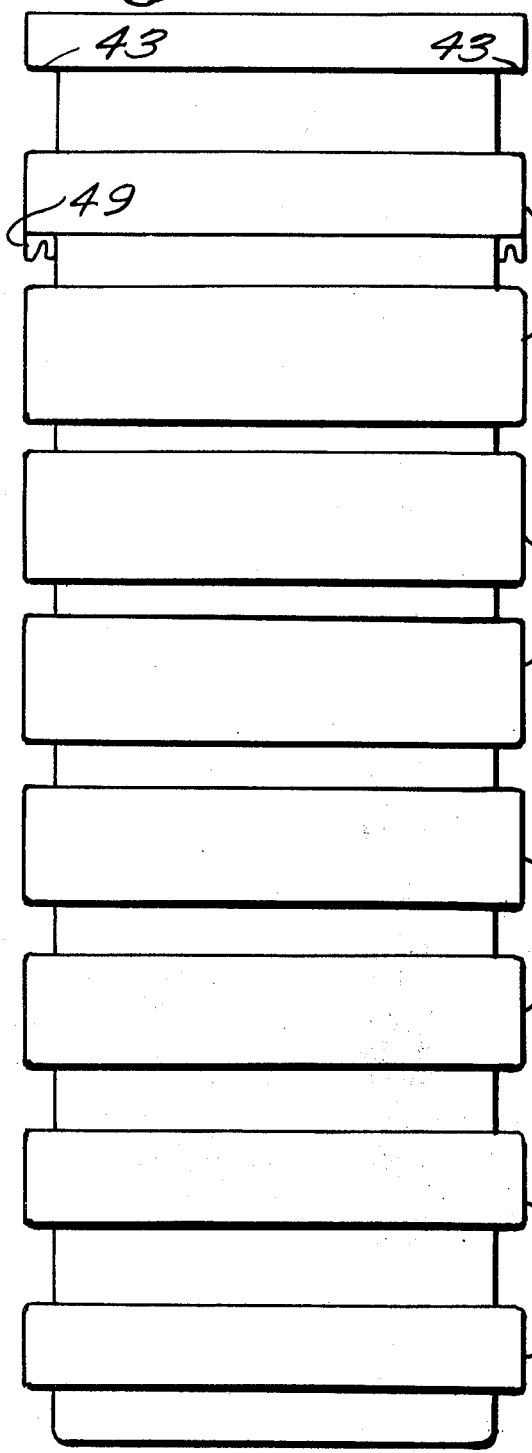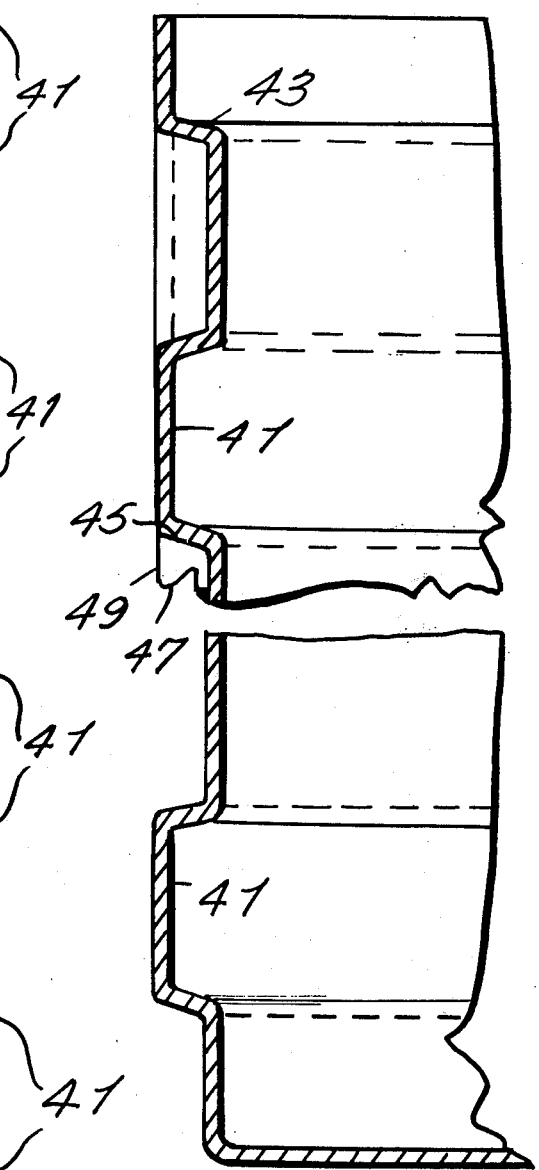

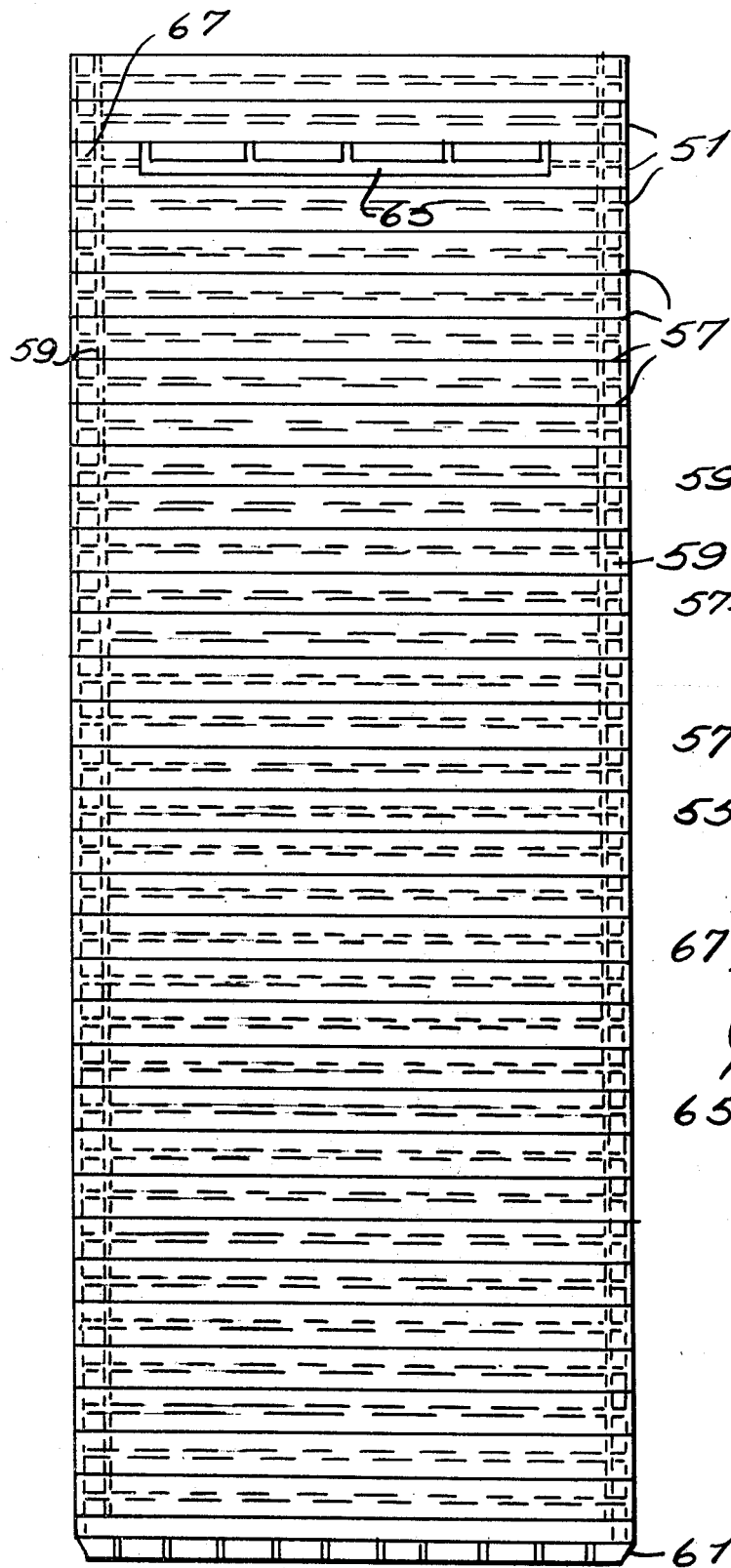
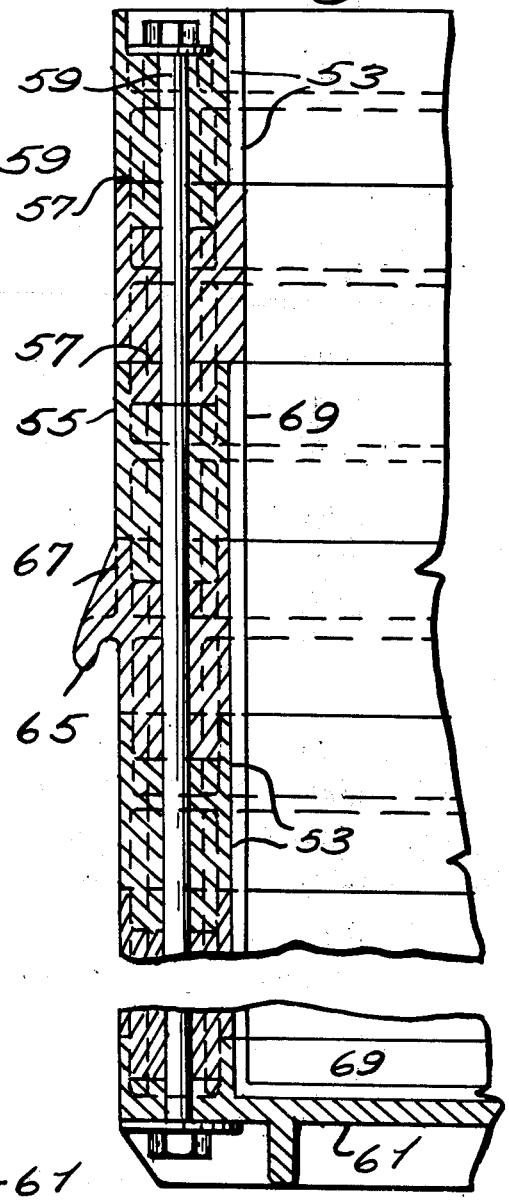

BATTERY JAR

BACKGROUND OF THE INVENTION

This invention relates to an improved light-weight battery jar formed of a plastic material and having substantial strength in the transverse direction.

In the past battery jars for storage batteries have been typically formed of a heavy material such as metal and/or hardened rubber. The steel or metal structure has been required because of the weight of the battery plates which are typically comprised of lead or a lead compound. These plates are particularly heavy when used in storage batteries of the type utilized by industry wherein the plates are typically in the neighborhood of 4½ feet long. Thus, when a plurality of such plates are placed in a battery jar together with an electrolyte, a substantial pressure bears against the side walls and bottom of the battery jar. In addition, the acid in the electrolyte tends to eat away at the metal. Accordingly, a liner consisting of hard rubber has been typically utilized to isolate the steel shell of the battery jar from the electrolyte contained therein. The combination of providing a strong metal casing with a hard rubber lining has resulted in a heavy, cumbersome and expensive battery jar arrangement.

An example of prior art battery jars is disclosed in Marx U.S. Pat. No. 897,472 wherein an acid barrier of hard rubber is provided in the inside of a battery jar casing which includes a sheet of metallic material having two horizontal ribs extending about the periphery thereof to add strength to the casing. This battery provides no means for preventing the battery casing from bulging in the transverse direction except for the pair of ribs which are positioned at the top and bottom of the battery jar. Thus, over a substantial length of the battery no means are provided for strengthening the battery against transverse bulging forces.

In order to overcome the problem of combining a hard rubber acid barrier with a steel outer casing Boyer developed, as disclosed in U.S. Pat. No. 1,425,574, a battery jar which is made solely from hard rubber. The hard rubber casing has several ribs positioned horizontally about the periphery thereof in order to provide support against lateral bulging. This battery jar required both an inner and outer hard rubber casing in order to provide the necessary support for the lead acid storage cells contained therein. Accordingly, the battery was both heavy and bulky due to the substantial thickness of the hard rubber required for supporting the battery.

Other known battery casings have a plastic outer shell which provides both an acid barrier and support for the battery. However, these battery casings are typically used for storage batteries of the type utilized in automobiles which batteries do not have the heavy elongated plates typically utilized in industrial applications.

Accordingly, it is an object of this invention to provide a battery jar for supporting elongated battery plates such as utilized in industrial applications.

It is another object of this invention to provide an economical and relatively lightweight battery jar made of plastic material for supporting heavy duty battery plates therein.

SHORT STATEMENT OF THE INVENTION

Accordingly, this invention relates to a battery jar for supporting a plurality of battery plates and an electrolyte therein. The battery jar includes an elongated casing formed of a plastic material wherein the thermoplastic material provides both an acid barrier and a means for supporting the weight of the electrolyte and the battery plate. The casing includes a plurality of transversely disposed pressure bearing ribs about the periphery of the casing for providing support against the radial bulge pressure exerted against the casing.

In a second embodiment, the battery jar is formed of a plastic material wherein the casing of the battery includes a plurality of vertical ribs which extend along a substantial portion of the length of the casing. A plurality of hoop supporting surfaces is formed in transverse rows about the external periphery of the casing for supporting a plurality of hoops which are positioned about the casing and which are fixed with respect thereto by the hoop supporting surfaces. The vertical ribs provide support in the vertical direction and the hoops provide support against the radial bulge pressure exerted by the weight of the battery plates and the outward pressure of the electrolyte.

In a third embodiment the battery jar includes a casing formed of plastic material as in the other embodiments and has a plurality of transverse ribs positioned about the periphery of the casing and formed integral therewith. The ribs provide increased support against transverse or radial bulge forces but permit the elongation of the casing in the longitudinal direction when the casing is lifted. Each of the aforementioned embodiments provides a relatively inexpensive means for supporting a battery therein and in addition provides the strength required for withstanding the longitudinal and transverse bulge pressures generated by the weight of the battery plates and the pressure of the electrolyte.

BRIEF DESCRIPTION OF THE DRAWINGS

Other objects, features and advantages of the present invention will become fully understood from the following detailed description, appended claims and accompanying drawings in which:

FIG. 5 is a plan view of a portion of the hoop which extends about the periphery of the battery of FIG. 1;

FIG. 6 is an illustration of a second embodiment of the invention showing a battery jar having a plurality of horizontal ribs thereabout;

FIG. 7 is a partial section view of the battery of FIG. 6;

FIG. 8 is an elevation view of another embodiment of the present invention showing a plurality of supporting ribs stacked one on top of the other; and FIG. 9 is a partial section view of the battery of FIG. 8.

DETAILED DESCRIPTION OF THE PREFERRED EMBODIMENT

Figure 1:
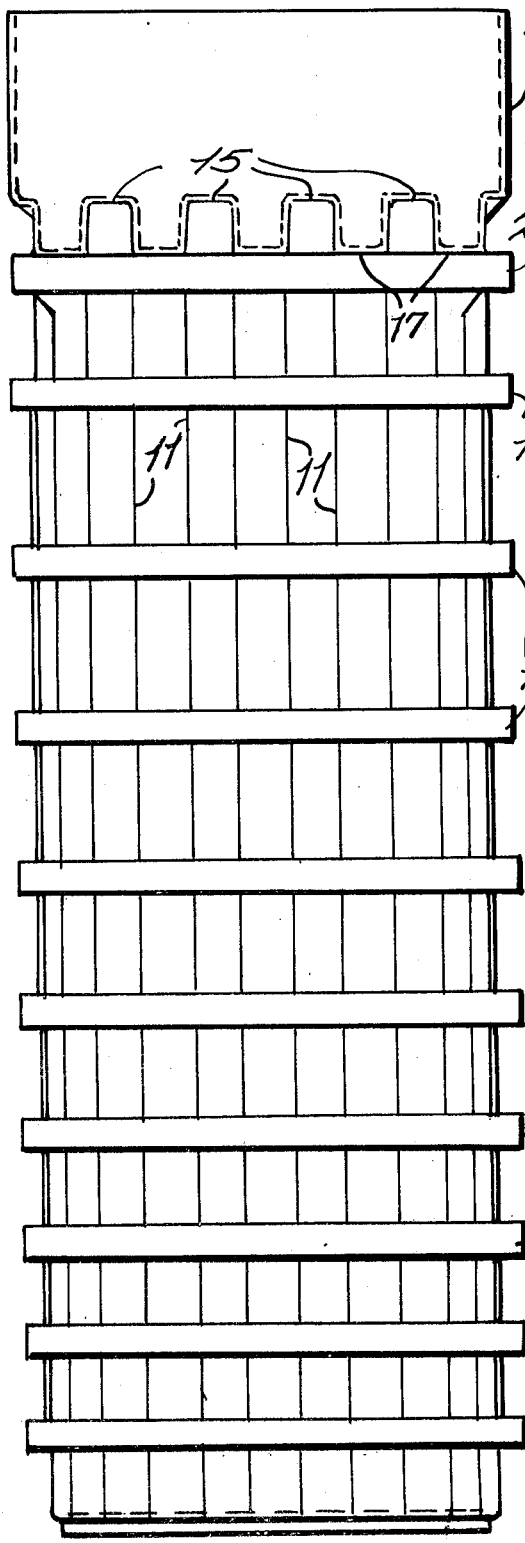
FIG. 1 is a side elevation view of the battery jar of the present invention having vertical ribs with horizontal hoops positioned thereabout.

Refer now to FIG. 1 where there is disclosed the battery casing of the present invention which is formed of a commercially available plastic compound such as polycarbonate or ABS. ABS is a common, commercially known name for the compound styrene-acrylonitrile. These compounds are less costly per casing and substantially easier to work with than hard rubber or rubber-coated steel and in addition are lighter than steel or rubber. While in the preferred embodiment, the battery casing is approximately 0.15 inches thick and approximately 52 inches long, it should be understood that other appropriate battery jar dimensions could be utilized in keeping with the present invention. The battery casing as illustrated includes a plurality of vertical ribs 11 extending about the periphery thereof, which ribs provide support in both the vertical-longitudinal direction and in the transverse direction. The vertical ribs terminate in an expanded top portion 13, the top portion being expanded to permit easy insertion of the battery plates into the casing.

Figure 2:
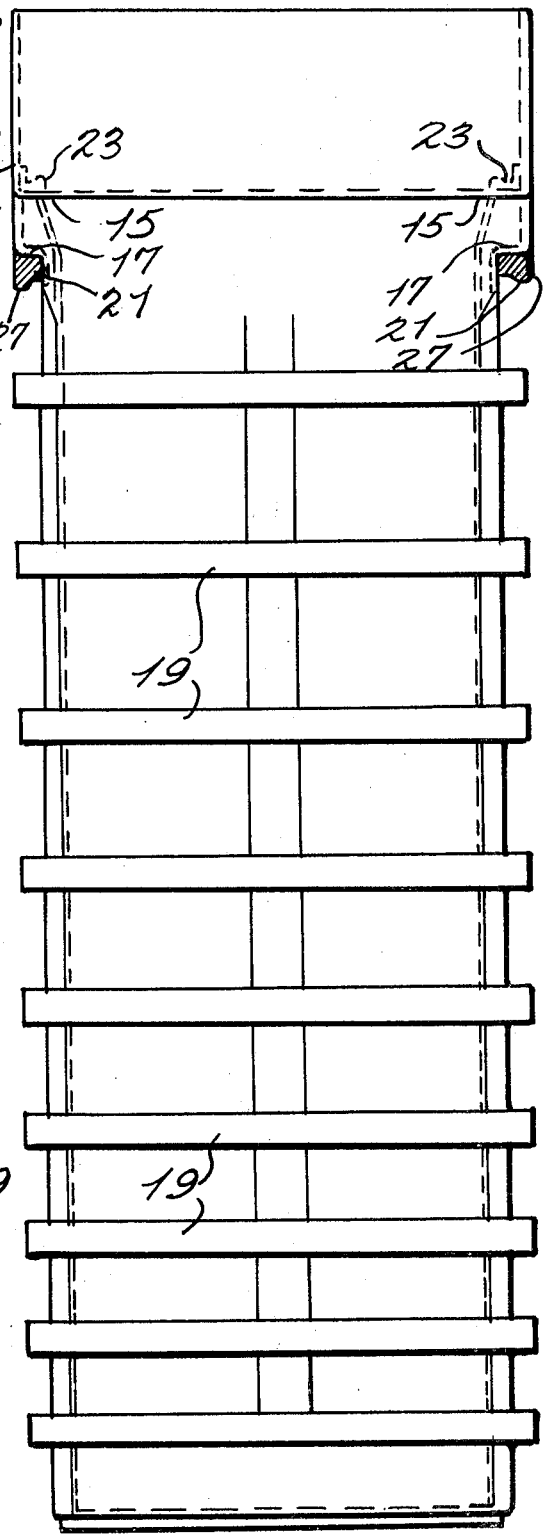
FIG. 2 is an end view of the battery of FIG. 1.

With reference to FIG. 2, the top portion of the casing 13 includes a pair of battery plate supporting surfaces 15 on each side thereof. In addition, a plurality of battery casing lift supporting surfaces 17 are provided onto which a lifting hoop 21 is bonded for providing a gripping surface by which the battery casing can be lifted.

A plurality of horizontally disposed hoops 19 are positioned about the periphery of the battery casing in a manner which will be explained more fully hereinbelow. The hoops are formed with an I-beam structure and are made by means of an injection molding process. As illustrated in FIG. 1, the hoops are positioned about the casing at progressively greater distances from one another from bottom to top. Thus, at the bottom the greatest transverse bulge pressures are generated by the electrolyte and accordingly the hoops near the bottom should be positioned relatively closer together; whereas, at the top of the jar the outward bulge pressures are not as great and the hoops are accordingly positioned further apart. However, it should be understood that the hoops could be positioned next to one another to form a continuous exterior surface, if desired. Such an arrangement would provide added strength and limit surface discontinuities on the exterior of the jar.

Referring again to FIG. 2, an extruded lifting hoop 21 is shown positioned about the battery casing against the lift supporting edges 17 of the casing. The lifting hoop is made of a plastic material such as polycarbonate or ABS and is formed by an extrusion or injection molding process. The lifting hoop 21 is then bonded to the casing by any suitable means known in the art. A plate supporting ledge 23 is shown positioned inside the casing on each side thereof. The plate supporting ledges rest on the battery plate supporting surface 15 and are bonded thereto by a suitable means known in the art.

Figure 3:
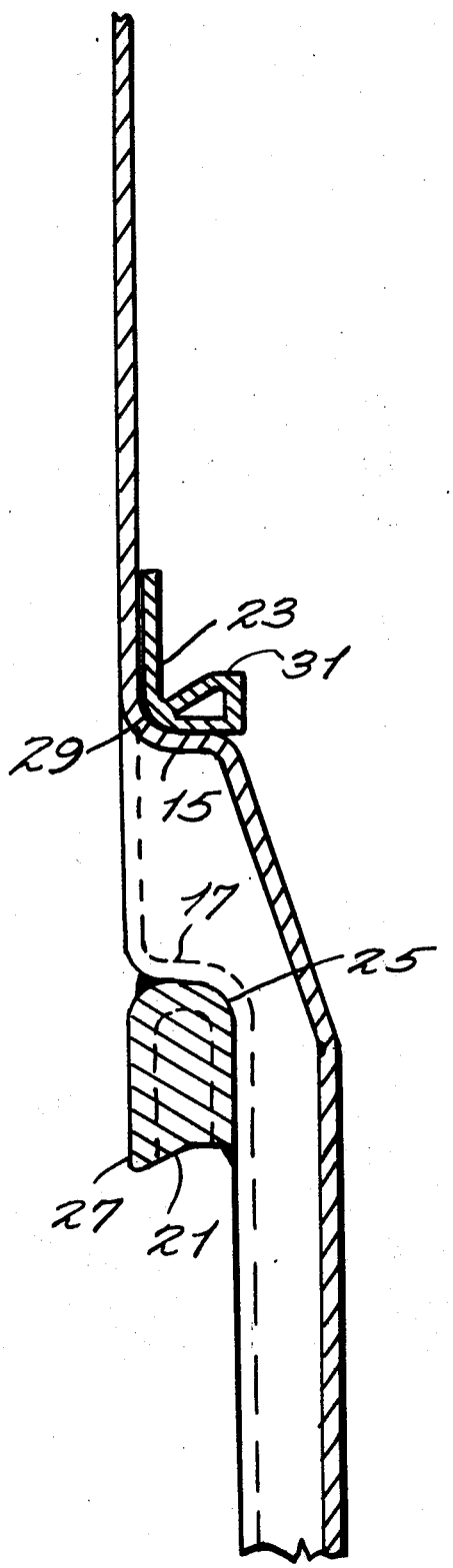
FIG. 3 is a partial section view of FIG. 1 showing the lifting edge structure of the battery.

Refer now to FIG. 3 which is a partial cut-away view of the battery jar of FIGS. 1 and 2 and shows the structure of the lifting hoop 21 and the plate supporting ledge 23. The lifting hoop 21 has a base portion 25 wich mates with the external surface 17 of the battery casing. The base portion 25 is contiguous with the battery casing edge 17 over a substantially large area in order to provide a relatively large bonding surface so that the lifting strip does not separate from the battery casing when the battery casing is being lifted. A retaining portion 27 is also provided which extends downwardly from the base 25 so that the prongs which lift the battery casing do not slip out and away from the lifting hoop 21.

Positioned on battery plate supporting surface 15 is the plate supporting ledge 23. The supporting ledge 23 includes a base portion 29 which mates with the surface 15 over a substantially large area thereof so that a large bonding surface is provided. The plate supporting ledge also includes a retaining portion 31 so that the frame structure which supports the battery plates does not slip away from the supporting ledge.

Figure 4:
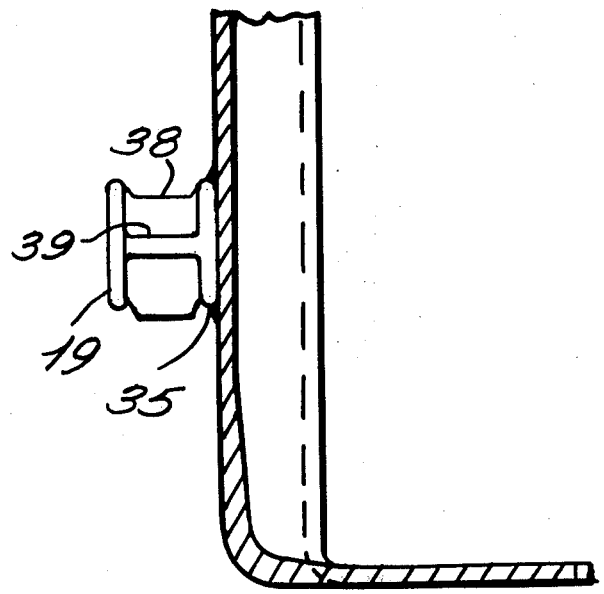
FIG. 4 is a partial section view of FIG. 1 showing the relative positions of the hoop supporting surfaces and the hoops.

Refer now to FIG. 4 where there is disclosed a partial section view of the outside periphery of the battery jar of FIGS. 1–3. When the battery casing is formed, the casing may be set so that the sides of the casing are bowed inwardly such that the hoops 19 can slip thereover. Once the hoops are in position they are bonded to the surface of the jar such that when the electrolyte is poured into the casing, the battery casing is pressed outwardly against the hoops with the hoops providing support against the bowing forces exerted against the walls of the jar. In an alternative embodiment, the outside periphery of the battery jar is formed with a plurality of indentations which mate with the inside periphery of the hoops 19. The hoop supporting surface provided by the indentations permit the hoop to be supported and retained with respect thereto.

Refer now to FIG. 5 which is a partial plan view of the hoops 19. As illustrated, the hoops are formed into an I-beam by means of injection molding. Thus, the hoops have two substantially parallel inner and outer surfaces 35 and 37, respectively. The inner surface 35 is positioned against the battery casing in order to fix the position of the hoop with respect to the casing. The outer surface 37 is connected to the inner surface by means of an interconnecting web 39 which provides the necessary support against forces exerted against the walls of the battery jar in the radial or transverse direction. Interlocking webs 38 provide added support and in addition provide an interlock means for mounting a plurality of hoops one on top of the other, if desired.

The battery jar of FIGS. 1–5 is not only a lightweight and economical casing but also provides substantial strength in both the transverse and longitidinal directions. Accodingly, large bulging forces generated by the pressure of the electrolyte and the weight of the battery plates are easily supported by the new and improved battery casing despite the fact that the walls of the jar are relatively thin.

Refer now to FIG. 6 which is a side elevation view of an alternate embodiment of the present invention. An integral battery casing is illustrated which is formed of a plastic material such as polycarbonate. The plastic casing is formed by a suitable rotational molding process known in the art so that no seams or joints are formed which might provide a weak link in the battery casing. The battery casing is formed with a plurality of ribs 41 which are of decreasing width from top to bottom. Thus the rib which is closest to the top of the casing is relatively wide and is separated from the next succeeding rib by a relatively small distance. The rib closest to the bottom is relatively narrow and is separated from its next succeeding rib by a relatively wide margin. The purpose for this arrangement of the ribs is to provide increased support against outwardly directed transverse bulging forces near the bottom of the battery casing where the pressure generated by the electrolyte is greatest. The horizontally disposed ribs perform a dual function, namely, they prevent "creep" due to fluid pressure in the transverse direction and in addition, permit expansion in the longitudinal direction so that as the lead plates grow in length with age, the corrugations or ribs permit the jar to increase in height along with the plates. In the preferred embodiment, the battery jar is approximately 52 inches long with the width of the battery jar being approximately 18 inches. However, any suitable dimensions could be utilized in accordance with the invention.

The battery plates can be lifted with the casing by means of battery plate supporting edges 43 which extend around the internal periphery of the top of the casing. As illustrated in FIG. 7, the casing includes a lift supporting surface 45 to which is bonded lift edge 47. The lift edge 47 is secured to the casing surface 45 by means of epoxy or any other suitable bonding compound. The lifting edge has a substantially large surface area so that a large bonding surface is provided and in addition the lifting edge includes lift retaining dogs 49 for preventing the lifting mechanism from slipping from the lifting edge 47.

Refer to FIG. 8 where another embodiment of the invention is illustrated. In this embodiment a battery casing is illustrated which includes a plurality of bulge barrier rings 51 which are positioned one on top of the other. The rings each include a substantially flat inside surface 53 and a flat outside surface 55 joined together by a connecting surface 57. The rings are each joined together by means of a connecting rod 59 which is secured to the bottom plate 61 at one end and to the top ring 63 at the other end. A lift supporting structure 65 is illustrated which is formed integral with one of the rings 67. The rings are typically formed of an injection molded plastic such as polycarbonate or ABS.

Refer now to FIG. 9 which is a partial section view of the casing of FIG. 8. As illustrated, an acid barrier which may include, for example, a plastic layer 69 is positioned on the inside of the battery casing formed by the rings 51. This acid barrier may be provided with a folded or accordion surface so as to permit the axial expansion of the lead plates of the battery with age. The rings, as illustrated, are joined together to form a smooth interior and exterior surface by means of the connecting rod 59. The ring 67 is shown having a lifting edge 65 formed integral therewith so that the battery casing can be lifted and moved. The rings 51 are formed with a substantial amount of hollow space therein in order to reduce the quantity of plastic utilized to form the casing while at the same time providing the strength necessary to support the battery casing against the transverse forces generated by the battery plates and the electrolyte.

The aforementioned embodiments of applicant's invention provide a strong and lightweight plastic battery casing capable of supporting substantial transverse pressures and longitudinal compression forces. In addition, the battery casing of this invention obviates the need for heavy steel casings heretofore utilized, thereby reducing the weight of the battery casing and providing a cost reduction thereof when measured in terms of cost per unit of weight. In addition, the one-piece construction provides both an acid barrier and a radial bulge barrier to thereby simplify the structure of the battery casing.

While the present invention has been disclosed with respect to a preferred embodiment, it should be realized that there are other embodiments which may be obvious variants of applicant's invention but which come within the spirit and scope of the invention as defined by the appended claims.

What is claimed is:

1. A battery jar comprising an elongated casing of a plastic material, said casing including a plurality of vertical ribs extending along a substantial portion of the length thereof and having a plurality of hoop supporting surfaces formed in a plurality of transverse rows about the external periphery of said casing, a plurality of hoops positioned about said casing and fixed with respect thereto by said hoop supporitng surfaces and supporting means positioned about the periphery of said casing and in surface contact with an abutting vertical force supporting portion of said casing.

2. A battery jar for supporting at the bottom thereof a plurality of battery plates comprising:
an elongated unitary casing comprising a plastic material, said casing having a bottom portion and a side wall portion, said side wall portion including means for providing increased support against transverse forces and for permitting elongation of said casing in the longitudinal direction as said battery plates grow with age, said means including a plurality of transverse rib portions extending about the periphery thereof, said ribs being formed integral with said side walls.

* * * * *